(12) United States Patent
Paterno et al.

(10) Patent No.: US 10,894,509 B2
(45) Date of Patent: Jan. 19, 2021

(54) UNIVERSAL BRAKE LIGHT CONTROL MECHANISM

(71) Applicant: Alpine 4 Technologies, Ltd, Phoenix, AZ (US)

(72) Inventors: Greg Paterno, Scottsdale, AZ (US); Jeff Hail, Scottsdale, AZ (US); Timmy Nguyen, San Jose, CA (US); Luke Roe, Glendale, AZ (US); Kent Wilson, Phoenix, AZ (US)

(*) Notice: Subject to any disclaimer, the term of this patent is extended or adjusted under 35 U.S.C. 154(b) by 554 days.

(21) Appl. No.: 15/648,080

(22) Filed: Jul. 12, 2017

(65) Prior Publication Data

US 2018/0022272 A1 Jan. 25, 2018

Related U.S. Application Data

(60) Provisional application No. 62/364,205, filed on Jul. 19, 2016.

(51) Int. Cl.
| | |
|---|---|
| *B60L 1/14* | (2006.01) |
| *B60Q 1/44* | (2006.01) |
| *B60Q 1/00* | (2006.01) |
| *B60Q 1/26* | (2006.01) |
| *B60Q 1/30* | (2006.01) |

(52) U.S. Cl.
CPC ............. *B60Q 1/44* (2013.01); *B60Q 1/0094* (2013.01); *B60Q 1/2696* (2013.01); *B60Q 1/302* (2013.01); *B60Q 2900/10* (2013.01)

(58) Field of Classification Search
CPC ........ B60Q 1/30; B60Q 11/005; B60Q 1/302; B60Q 1/0094; B60Q 2900/10; B60Q 1/44; B60Q 1/441; B60Q 1/2696
See application file for complete search history.

(56) References Cited

U.S. PATENT DOCUMENTS

| | | | |
|---|---|---|---|
| 5,345,218 A | 9/1994 | Woods et al. | |
| 5,798,619 A * | 8/1998 | Covington | ........... H05B 39/044 |
| | | | 315/307 |
| 6,414,437 B1 | 7/2002 | Dietz et al. | |
| 6,720,871 B2 | 4/2004 | Boyer et al. | |
| 6,943,677 B2 | 9/2005 | Boyer et al. | |
| 8,581,126 B1 * | 11/2013 | Cannella | ................ B60Q 1/444 |
| | | | 200/1 B |
| 2002/0075148 A1 * | 6/2002 | Boyer | .................... B60Q 1/444 |
| | | | 340/479 |

(Continued)

*Primary Examiner* — Rexford N Barnie
*Assistant Examiner* — Rasem Mourad
(74) *Attorney, Agent, or Firm* — Keith L. Jenkins, Registered Patent Attorney LLC; Keith L. Jenkins

(57) ABSTRACT

A brake light pulser, particularly for center high middle stop lamps, that senses the voltage and current requirements for various types of light-emitting devices (LEDs, LED arrays, incandescent lamps, etc.) and adjusts the supplied current and voltage to the particular type of light-emitting device to which it is connected. A microprocessor with a flash-based architecture is used to process the sensed current and amperage into signals to control a constant current/constant voltage controller to provide correctly configured power to a MOSFET. The MOSFET is controlled by the microprocessor, which stores pulse command sequences programmed in directly over a CAN bus or remotely via a serial data link from a built-in RF transceiver. The pulsed configured power output of the MOSFET is supplied to a brake light.

19 Claims, 2 Drawing Sheets

(56) References Cited

U.S. PATENT DOCUMENTS

| | | | |
|---|---|---|---|
| 2002/0105423 A1* | 8/2002 | Rast | B60Q 1/44 340/479 |
| 2006/0091817 A1 | 4/2006 | Herrig et al. | |
| 2009/0048538 A1* | 2/2009 | Levine | A61B 5/1116 600/587 |
| 2010/0007277 A1* | 1/2010 | Woodward | H05B 33/0851 315/77 |
| 2013/0119874 A1* | 5/2013 | Zhang | H05B 37/02 315/186 |
| 2014/0346951 A1 | 11/2014 | Adams et al. | |
| 2014/0361687 A1* | 12/2014 | Olson | F21S 43/195 315/80 |
| 2015/0360603 A1 | 12/2015 | Miner et al. | |
| 2019/0061608 A1* | 2/2019 | Baledge | B60Q 1/444 |

* cited by examiner

UNIVERSAL BRAKE LIGHT CONTROL MECHANISM

RELATED APPLICATIONS

This application claims the benefit of U.S. provisional patent application Ser. No. 62/364,205 filed Jul. 19, 2016 to the same inventors.

FIELD OF ART

This invention relates to a method and system for detecting whether a brake light is an incandescent light (bulb) or a light emitting diode (LED) and then controlling the voltage and/or the current to and through the light allowing for automatic control over the light. Particularly, this invention relates to the aftermarket installation of a device that will control a brake light in a vehicle, in a manner that helps prevent rear end collisions or increase the safety of the vehicles occupants, and in a manner that is universal in that it has identical results regardless of the manufacturer of the automobile or type of light being controlled. The invention is also further applicable to different sequences or different behaviors in the pulsing of the light that can be modified or made unique from application to application depending on the users' needs with the modification being facilitated after installation, in real time, or in the future via RF or other communication techniques.

BACKGROUND

Presently, installing aftermarket brake light pulsing devices is popular amongst car dealerships wishing to increase profits while giving customers a real and tangible benefit to the expense of having the dealership install an aftermarket device. Dealerships install this device in new and used vehicles either in advance of or at the time of purchase and the consumer agrees to pay for this installation under the premise of increased safety or insurance rebates. In recent years, light bulbs are more and more being replaced with LEDs or arrays of LEDs, all of which have different power requirements from manufacturer to manufacturer and from bulb to LED. In many cases, these newer LED and or LED arrays have internal circuitry so specific to its design that, in order to control the light properly with an aftermarket device, a circuit that may work for an incandescent bulb, in most cases, will not function correctly for an LED or LED array. Furthermore, a circuit that works for one specific LED or LED array might not work with another LED or incandescent bulb. This leaves dealers with either limiting the inventory to which they can install product to or, in some cases, installing product into vehicles that will fail to operate properly, only to have the expense of removing them and or losing customer confidence. Having a microprocessor controlled device that samples the power being consumed by the light during normal operation and has the circuitry and firmware necessary to intelligently take control of the light using the proper method, will not only provide a solution that will function properly in more vehicles, but also give confidence to the vehicle dealer that they can rely on consistent and proper operation when they install the device over prior devices.

Some retailers, such as motorcycle dealership, may wish to have a different sequence of pulsing more fit for a motorcycle. At present, this requires another device to be manufactured or changes to be made to the circuitry of the current devices. A programmable, microprocessor controlled device with Bluetooth, Wi-Fi, or Cellular capabilities can be programmed on or before delivery in a matter of minutes. In cases where future events or circumstances require a change to the sequence or behavior, in the field, programmability opens up endless possibilities for useful applications.

SUMMARY OF THE INVENTION

In an embodiment, a brake light pulser operable to adaptively supply correct voltage and amperage to any one of a plurality of various types of light-emitting devices, each type of light-emitting device of the plurality of various types of light-emitting devices having a unique voltage requirement and a unique amperage requirement. That brake light pulser, where the various types of light-emitting devices include: an LED; an LED array; and an incandescent light source. That brake light pulser, including a power supply which, when installed, is adapted to: receive brake light power from an automotive power source; and supply DC input power to a microprocessor and an RF transceiver. That brake light pulser, including a sensor which, when installed, is adapted to: measure the unique voltage requirement and the unique amperage requirement; and communicate the unique voltage requirement and the unique amperage requirement to a microprocessor. That brake light pulser, including the microprocessor which, when installed, is adapted to: receive communication of the measured unique voltage requirement and the unique amperage requirement; store samples of the measured unique voltage requirement and the unique amperage requirement; generate control signals responsive to the stored unique voltage requirement and the unique amperage requirement samples; and communicate the control signals to a constant voltage/constant current controller. That brake light pulser, including the microprocessor having; a flash-based architecture; a Contoller Area Network (CAN) bus connection adapted to communicate programming instructions to the microprocessor, where the instructions determine at least one pulse command sequence; and a capacity to store the at least one pulse command sequence. That brake light pulser, including the constant voltage/constant current controller which, when installed, is adapted to: receive brake light power from an automotive power source; receive communication of the control signals from the microprocessor; configure the brake light power responsive to the control signals; and provide the configured brake light power to a MOSFET. That brake light pulser, including an RF transceiver which, when installed, is adapted to: communicate programming instructions to the microprocessor, where the instructions determine the at least one pulse command sequence; and communicate data to a user. That brake light pulser, including the MOSFET which, when installed, is adapted to: receive the configured brake light power from the constant voltage/constant current controller; receive the at least one pulse command sequence from the microprocessor: pulse the configured brake light power responsive to the at least one pulse command sequence; and supply the pulsed configured brake light power to a brake light.

A brake light pulser operable to: adaptively supply correct voltage and amperage to any one of a plurality of various types of light-emitting devices, each type of light-emitting device of the plurality of various types of light-emitting devices having a unique voltage requirement and a unique amperage requirement; and where the various types of light-emitted devices include: an LED; an LED array; and an incandescent light source. That brake light pulser, including a sensor which, when installed, is adapted to measure the unique voltage requirement and the unique amperage requirement; and communicate the unique voltage requirement and the unique amperage requirement to a microprocessor. That brake light pulser, including the microprocessor which, when installed, is adapted to: receive communication of the measured unique voltage requirement and the unique amperage requirement; store samples of the measured unique voltage requirement and the unique amperage requirement; generate control signals responsive to the stored unique voltage requirement and the unique amperage requirement samples; and communicate the control signals to a constant voltage/constant current controller. That brake light pulser, including the microprocessor having; a flash-based architecture; a Contoller Area Network bus connection adapted to communicate programming instructions to the microprocessor, where the instructions determine a pulse command sequence; and a capacity to store the pulse command sequence. That brake light pulser, including the constant voltage/constant current controller which, when installed, is adapted to: receive brake light power from an automotive power source; receive communication of the control signals from the microprocessor; configure the brake light power responsive to the control signals; and provide the configured brake light power to a MOSFET. That brake light pulser, including an RF transceiver which, when installed, is adapted to: communicate programming instructions to the microprocessor, where the instructions determine at least one pulse command sequence; and communicate data to a user. That brake light pulser, including the MOSFET which, when installed, is adapted to: receive the configured brake light power from the constant voltage/constant current controller; receive the at least one pulse command sequence from the microprocessor: pulse the configured brake light power responsive to the at least one pulse command sequence; and supply the pulsed configured brake light power to a brake light.

A brake light pulser: operable to adaptively supply correct voltage and amperage to any one of a plurality of various types of light-emitting devices, each the type of light-emitting device of the plurality of various types of light-emitting devices having a unique voltage requirement and a unique amperage requirement; including a sensor which, when installed, is adapted to: measure the unique voltage requirement and the unique amperage requirement; and communicate the unique voltage requirement and the unique amperage requirement to a microprocessor; including the microprocessor which, when installed, is adapted to: receive communication of the measured unique voltage requirement and the unique amperage requirement; store samples of the measured unique voltage requirement and the unique amperage requirement; generate control signals responsive to the stored unique voltage requirement samples and the unique amperage requirement samples; and communicate the control signals to a constant voltage/constant current controller; where the microprocessor includes: a flash-based architecture; a Controller Area Network bus connection adapted to communicate programming instructions to the microprocessor, where the instructions include at least one pulse command sequence; a serial communications link between the microprocessor and an RF transceiver adapted to communicate remotely-originated programming instructions to the microprocessor, where the instructions include at the least one pulse command sequence; and storage capacity for the at least one pulse command sequence. That brake light pulser, including: the constant voltage/constant current controller which, when installed, is adapted to: receive brake light power from an automotive power source; receive communication of the control signals from the microprocessor; configure the brake light power responsive to the control signals; and provide the configured brake light power to a MOSFET; including the MOSFET which, when installed, is adapted to: receive the configured brake light power from the constant voltage/constant current controller; receive the at least one pulse command sequence from the microprocessor; pulse the configured brake light power responsive to the at least one pulse command sequence; and supply the pulsed configured brake light power to a brake light; That brake light pulser, including an RF transceiver which, when installed, is adapted to: communicate programming instructions to the microprocessor, where the instructions determine the at least one pulse command sequence; and communicate data to a user. That brake light pulser, including a power supply which, when installed, is adapted to: receive brake light power from an automotive power source; and supply DC input power to the microprocessor and the RF transceiver.

In one embodiment of the present invention, a microprocessor controls the power to a brake light in a manner that allows full control of a brake light regardless of the lights pre-existing circuitry and power requirements, and in a manner that is programmable in the field and/or in real time.

The present invention is manufactured with crimp on or PCB connections that allow for quick and easy installation into most vehicles in a manner that allows full control over a brake light, i.e. a center high middle stop lamp (CHMSL).

The present invention contains a circuit and/or firmware that has the ability to control the power to the light with either a constant current or constant voltage method allowing for consistent results in intensity and appearance regardless of bulb type or manufacturer or pre-existing circuitry.

The circuit and or firmware can have the ability to interface and communicate with a Closed Area Network (CAN) within the vehicle into which it is being installed.

BRIEF DESCRIPTION OF THE DRAWINGS

The present invention will hereinafter be described in conjunction with the following drawing figures, wherein like numerals denote like elements.

DETAILED DESCRIPTION

As used and described herein, "microprocessor" includes micro controllers and similar reprogrammable controllers, regardless of circuit configuration.

The invention is manufactured with crimps and connections that allow for installation in most automobiles and vehicles in the target market. After installation, and when the vehicle operator engages the braking system of the vehicle, the invention immediately senses that the brake is engaged and allows normal power to the light while taking samples of this power usage and recording these values as a reference point in determining the best way to control the light. Reference sample values are saved to flash memory within the microprocessor and other reference measurements may be taken at certain intervals depending on the firmware. Reference sample values include current and voltage and may include any other characteristic deemed reliable in making the best determination as to the proper control method or procedure. The reference values are samples taken fast enough that, in an extremely short amount of time, the circuit and firmware can accurately determine what type of light is being controlled as well as the best method to use to control the light. Finally, control of the light is initiated and any sequence, intensity, or pattern of light pulses that may decrease the probability of a rear end collision or increase the overall safety of the vehicles occupants can be implemented.

The invention contains a wireless capability with which to communicate with outside devices. This communication allows existing inventory to be reprogrammed for a new customer requirements, or to reprogram and modify previously installed devices with new firmware. This communication may include, for non-limiting examples, Cellular, WiFi or Bluetooth, all of these methods, or another similarly effective method.

Figure 1:
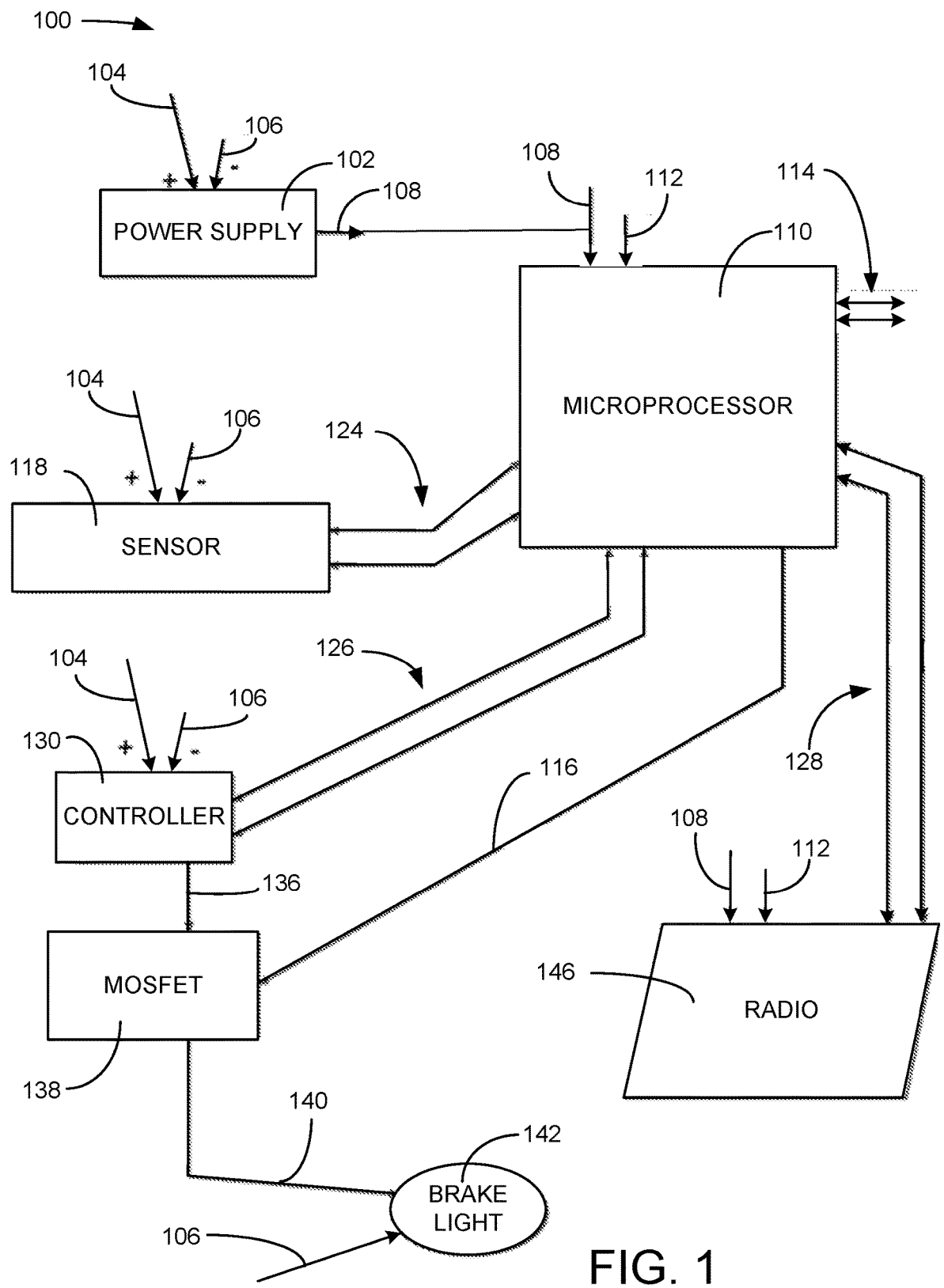
FIG. 1 is a block diagram illustrating an exemplary programmable microprocessor-controlled brake light control mechanism circuit, in accordance with a preferred embodiment of the present invention.

FIG. 1 is a block diagram illustrating an exemplary programmable microprocessor-controlled brake light control mechanism circuit 100, in accordance with a preferred embodiment of the present invention. There are six major components to the circuit 100. Five-volt DC (hereinafter "5 VDC") power supply 102 receives positive brake light power 104 from an automotive power source to develop a potential relative to battery ground 106 and provides 5 VDC 108 to the microprocessor 110 and the radio 146. A 5 VDC power supply 102 was chosen to keep thermal ratings at a minimum. In an additional embodiment, a 3.3 VDC power supply may be used. The power supply 102 simply takes the voltage 104 that is normally supplied to the brake light 142 and regulates it down to a level that is required by the microprocessor 146 and other major components of the circuit 100. The 5 VDC power supply 102 does not affect the resulting power 140 to the brake light 142.

Hall affect current sensor 118 measures the current drawn by the brake light 142 as measured between positive brake light power 104 and battery ground 106. Sensor 118 is preferred for accuracy, low component count, and direct serial communication connection 124 to the microprocessor 110. The brake light current, up to fifteen amps DC, can accurately be measured with sensor 118. Most currently deployed brake lights rarely exceed four amps DC, enabling use with any brake light 142 in any vehicle to be measured. The output 124 of sensor 118 is used to control the current and voltage to the brake light 142, as will be discussed further below. In various other embodiments, similarly effective sensors may be used.

Microprocessor 110 has a flash based architecture, enabling high speed computation and versatility for future use. Microprocessor 110 operates at more than four Million Instructions Per Second (MIPS), leaving plenty of room for calculating inputs 124, 126, 128, and 114, configuring outputs 116, 124, 126, 128, and 114 and initiating a pulse sequence in fractions of a second, thereby helping to cut reaction time to any threat of a rear end collision. The microprocessor 110 is equipped with serial communications and can communicate with all peripheral smart devices 118, 130, and 146 in the circuit 100 as well as most peripherals that may comprise future revisions. Because the microprocessor 110 is flash based, it can be programmed and reprogrammed as many times as needed and is able to store data even if power is completely lost to the circuit 100.

Microprocessor 110 can be remotely programmed to produce various pulse sequences, including control of pulse length, frequency, and intensity. For non-limiting example. a pulse sequence making the light bright for 0.6 seconds, then dim for 0.2 seconds, repeating five times, and then returning to normal brake light operation. For another non-limiting example, motorcycle riders prefer longer pulse sequences than automobile drivers, and these differences can be accommodated by the same programmable microprocessor-controlled brake light control mechanism circuit 100 using different programs in the microprocessor 110. Further, the programmable microprocessor-controlled brake light control mechanism circuit 100 adapts to the differences in the type of vehicle and the type of brake light 142. For yet another non-limiting example, there is a preference to avoid pulse frequencies that may excite epileptic responses in persons observing the pulse sequence, and those frequencies can be avoided by appropriate programming.

The constant current/constant voltage controller 130 portion of the circuit 100 receives positive brake light power 104 from an automotive power source and develops a potential relative to battery ground 106. Controller 130 is also in serial communication 126 with microprocessor 110. Constant current/constant voltage controller 130 configures the configured power output 136, responsive to signals from the microprocessor 110, to power the brake light 142, regardless of whether brake light 142 uses any incandescent bulb, any LED, or any LED array and regardless of the vehicle type.

Those of skill in the art, enlightened by the present disclosure, will appreciate that an LED array may eventually have one or more failed LEDs in the array, thereby causing a small change in power consumption. The present invention can sense that change and adapt to it. Additionally, incandescent bulbs may experience changes in power consumption with age, and the present invention can adapt to such changes.

The power MOSFET 136 is a switch operable to switch the configured power output 136 from the constant current/constant voltage controller 130 to various output 140 power levels, responsive to MOSFET control signals 116 from the microprocessor 110. The various output 140 power levels modulate the brightness of the brake light 142. Brake light 142 is coupled to battery ground 106 to complete the circuit 100.

The radio 146 portion of the circuit 100 may be configured with various communication protocols, responsive to the needs of the customer. For non-limiting examples, communications protocols may be cellular, RF, WiFi, Bluetooth, NFC, or other available RF protocol. The radio circuit 146 can be used to reprogram the microprocessor via serial communications link 128, enabling firmware 200 (see FIG. 2) revisions, and alterations. Serial communications link 128 can also be used to supply data to a user. Power for the radio circuit 146 is from a potential developed between 5 VDC input 108 and ground 112.

CAN bus 114 can be used to reprogram the microprocessor from a user interface within the vehicle or coupled to the vehicle CAN bus 114.

Figure 2:
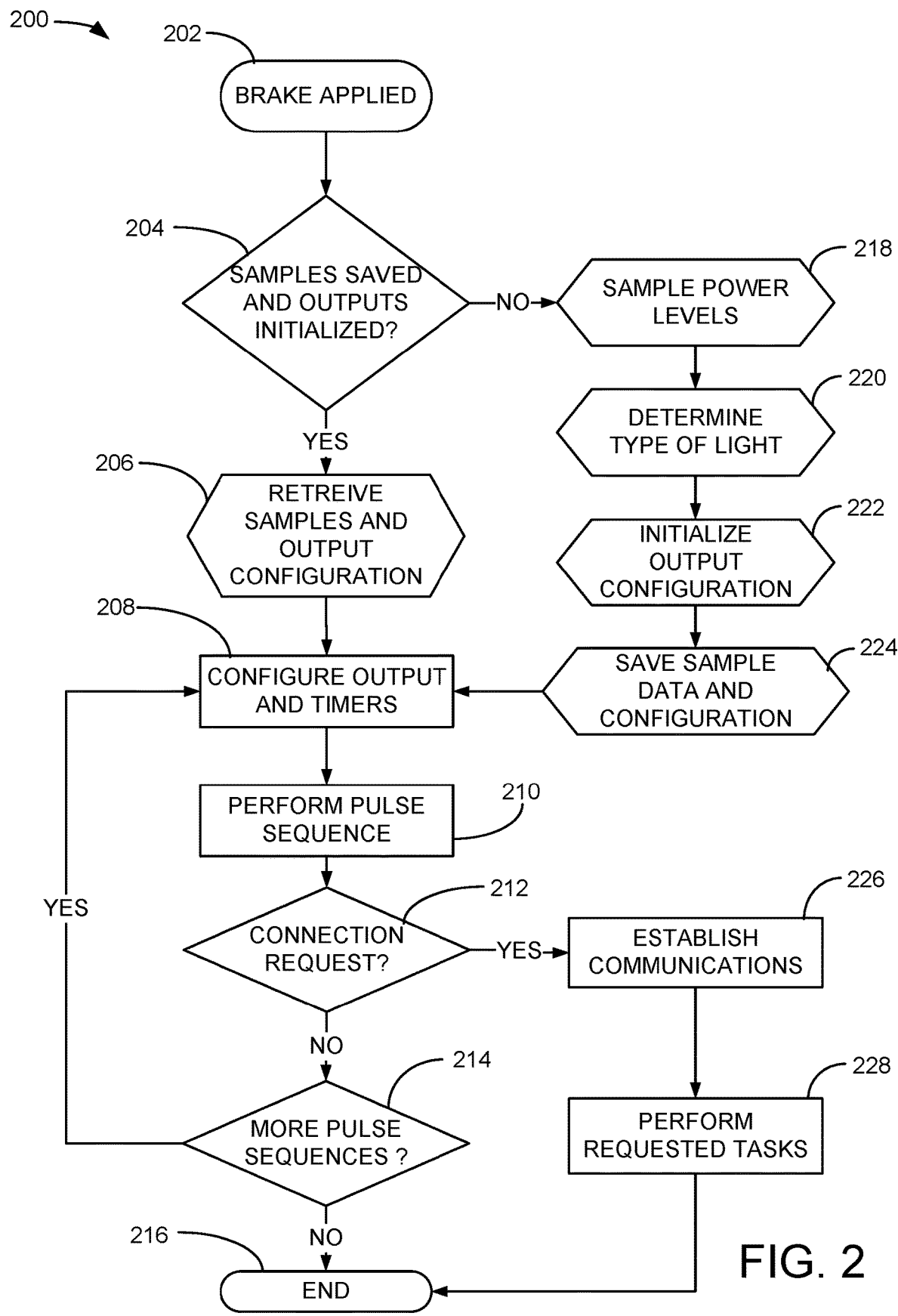
FIG. 2 is a flow chart illustrating an exemplary firmware program flow of the exemplary programmable microprocessor-controlled brake light control mechanism circuit of FIG. 1, in accordance with a preferred embodiment of the present invention.

FIG. 2 is a flow chart illustrating an exemplary firmware 200 program flow of the exemplary programmable microprocessor-controlled brake light control mechanism circuit 100 of FIG. 1, in accordance with a preferred embodiment of the present invention. Design constraints on the firmware 200 include speed and accuracy. The firmware 200 only operates when the brake is applied 202, so recording two or three sample values 224 and then letting the circuit 100 use these values in the future saves time for future calculations once the reference sample values are stored 224. The firmware 200 first checks 204 if initialized sample values are stored in flash memory by checking 204 a register flag to confirm there are saved samples available. If so, sampling 218 is not necessary and an output configuration is already stored 224. In step 206, stored samples and the stored output configuration is retrieved from flash memory and used in step 208 to configure the output to the brake light 142 and configure the timers that control the power MOSFET 138. In step 210, the pulse sequence is performed, responsive to the output configuration and the timer configuration, to pulse the brake light 142. Although the brake light circuit 100 might be programmed for many cycles of pulsing, in between each cycle the firmware 200 checks 212 for a request for communication on the serial port 128 from the radio 146. If communication is requested, the normal pulse sequence is abandoned and the communications sub-routine is begun 226 to perform a requested task 228 which is either a software update or software modification routine. Additionally, saved values can also be sent externally for evaluation by engineers or technicians via radio 146.

Referring again to step 204, if there are no samples saved when the brake is applied 202, the firmware 200, in step 218, samples brake light power levels from sensor 118. Based on the samples, the firmware 200 determines, in step 220, the type of illumination source used in the brake light 142. Based on that determination 220, the output configuration is initialized in step 222. In step 224, the sample data and output configuration is saved, the flag is set to indicate that samples have been saved, and control is passed to step 208.

Only one exemplary embodiment has been presented, but many others are within the scope of the present invention. Particularly, using a microprocessor/sensor system to determine the type of illumination source used by a brake light and adapting power to that illumination source is one of several advantageous novelties of the present invention. The use of a single microprocessor to control the current and voltage as well as the pulse sequence is an advantageous novelty of the present invention. Reprogrammability of the microprocessor via radio during brake light operation is another advantageous novelty of the present invention. Configuring both amperage and voltage of the power supplied to the brake light is yet another advantageous novelty of the present invention. Combinations of exemplified advantageous novelties constitute additional advantageous novel features of the invention. Those of skill in the art, enlightened by the present disclosure, will be aware of variations and substitutions that perform the same functions, all of which are within the scope of the present invention.

We claim:
1. A brake light pulser:
 a. comprising:
  i. a low voltage direct current power supply;
  ii. a microprocessor coupled to said power supply;
  iii. an RF transceiver powered by said power supply and in data communication with said microprocessor, wherein said microprocessor is reprogrammable via said RF transceiver to modify data sensed by a current sensor;
  iv. the current sensor in direct serial communication with said microprocessor and operable to determine and communicate a current in a brake light;
  v. a constant current/constant voltage controller in serial communication with said microprocessor;
  vi. a MOSFET operable to conduct power from said constant current/constant voltage controller to said brake light responsive to control signals from said microprocessor; and
 b. operable to supply various combinations of voltage and amperage to respective various types of pulsable light-emitting devices responsive to an output of said current sensor,
 each said type of light-emitting device of said various types of light-emitting devices having a unique voltage requirement and a unique amperage requirement.

2. The brake light pulser of claim 1, wherein said various types of light-emitting devices include:
 a. an LED;
 b. an LED array; and
 c. an incandescent light source.

3. The brake light pulser of claim 1, comprising a said current sensor operable to: a. measure said unique amperage requirement; and b. communicate said unique amperage requirement to said microprocessor.

4. The brake light pulser of claim 3, comprising said microprocessor operable to:
 a. receive communication of said unique amperage requirement;
 b. determine said unique voltage requirement;
 c. store samples of said unique voltage requirement and said unique amperage requirement;
 d. generate control signals responsive to said stored unique voltage requirement and said unique amperage requirement samples; and
 e. communicate said control signals to said constant voltage/constant current controller.

5. The brake light pulser of claim 3, comprising said microprocessor having:
 a. a flash-based architecture;
 b. a Controller Area Network bus connection operable to communicate reprogramming instructions to said microprocessor, wherein said instructions determine at least one pulse command sequence; and
 c. a capacity to store said at least one pulse command sequence.

6. The brake light pulser of claim 5, comprising said constant voltage/constant current controller operable to: a. receive brake light power from an automotive power source; b. receive communication of said control signals from said microprocessor; c. configure said brake light power responsive to said control signals; and d. provide said configured brake light power to said MOSFET.

7. The brake light pulser of claim 6, comprising said RF transceiver operable to: a. communicate reprogramming instructions to said microprocessor, wherein said reprogramming instructions determine said at least one pulse command sequence; and b. communicate data from said microprocessor to a user.

8. The brake light pulser of claim 6, comprising said MOSFET operable to:
 a. receive said configured brake light power from said constant voltage/constant current controller;
 b. receive said at least one pulse command sequence from said microprocessor;
 c. pulse said configured brake light power responsive to said at least one pulse command sequence received by said MOSFET; and
 d. supply said pulsed configured brake light power to said brake light.

9. A brake light pulser:
a. comprising:
i. a low voltage direct current power supply;
ii. a microprocessor coupled to said power supply;
iii. an RF transceiver powered by said power supply and in data communication with said microprocessor, wherein said microprocessor is reprogrammable via said RF transceiver to modify data sensed by a current sensor;
iv. the current sensor in direct serial communication with said microprocessor and operable to determine and communicate a current in a brake light;
v. a constant current/constant voltage controller in serial communication with said microprocessor;
vi. a MOSFET operable to conduct power from said constant current/constant voltage controller to said brake light responsive to control signals from said microprocessor; and
b. operable to supply correct voltage and amperage to each type of any one of a plurality of various types of pulsable light-emitting devices responsive to an output of said current sensor, each said type of light-emitting device of said plurality of various types of light-emitting devices having a unique voltage requirement and a unique amperage requirement; and
c. wherein said various types of light-emitting devices include:
i. an LED;
ii. an LED array; and
iii. an incandescent light source.

10. The brake light pulser of claim 9, comprising said current sensor operable to: a. measure said unique amperage requirement; and b. communicate said unique voltage requirement and said unique amperage requirement to said microprocessor.

11. The brake light pulser of claim 10, comprising said microprocessor operable to:
a. receive communication of said unique voltage requirement and said unique amperage requirement;
b. determine said unique voltage requirement;
c. store samples of said unique voltage requirement and said measured unique amperage requirement;
d. generate control signals responsive to said determined unique voltage requirement and said unique amperage requirement samples; and
e. communicate said control signals to said constant voltage/constant current controller.

12. The brake light pulser of claim 10, comprising said microprocessor having;
a. a flash-based architecture;
b. a Controller Area Network bus connection operable to communicate reprogramming instructions to said microprocessor, wherein said instructions determine at least one pulse command sequence; and
c. a capacity to store said at least one pulse command sequence.

13. The brake light pulser of claim 11, comprising said constant voltage/constant current controller is operable to:
a. receive brake light power from an automotive power source;
b. receive communication of said control signals from said microprocessor;
c. configure said brake light power responsive to said control signals; and
d. provide said configured brake light power to said MOSFET.

14. The brake light pulser of claim 13, comprising said RF transceiver operable to: a. communicate reprogramming instructions to said microprocessor, wherein said reprogramming instructions determine at least one pulse command sequence; and b. communicate data from said microprocessor to a user.

15. The brake light pulser of claim 13, comprising said MOSFET operable to:
a. receive said configured brake light power from said constant voltage/constant current controller;
b. receive said at least one pulse command sequence from said microprocessor:
c. pulse said configured brake light power responsive to said at least one pulse command sequence; and
d. supply said pulsed configured brake light power to said brake light.

16. A brake light pulser:
a. comprising:
i. a low voltage direct current power supply;
ii. a microprocessor coupled to said power supply;
iii. an RF transceiver powered by said power supply and in data communication with said microprocessor;
iv. a current sensor in direct serial communication with said microprocessor and operable to determine and communicate a current in a brake light;
v. a constant current/constant voltage controller in serial communication with said microprocessor;
vi. a MOSFET operable to conduct power from said constant current/constant voltage controller to said brake light responsive to control signals from said microprocessor; and
b. operable to supply correct voltage and amperage to each type of any one of a plurality of various types of pulsable light-emitting devices, each said type of light-emitting device of said plurality of various types of light-emitting devices having a unique voltage requirement and a unique amperage requirement operable to supply correct voltage and amperage to respective each type of any one of a plurality of various types of pulsable light-emitting devices, each said type of light-emitting device of said plurality of various types of light-emitting devices having a unique voltage requirement and a unique amperage requirement;
c. comprising said current sensor operable to: i. measure said unique amperage requirement; and ii. communicate said unique amperage requirement to a microprocessor;
d. comprising said microprocessor operable to: i. determine said unique voltage requirement; ii. receive communication of said measured unique voltage requirement and said unique amperage requirement; iii. store samples of said measured unique voltage requirement and said unique amperage requirement; iv. generate control signals responsive to said stored unique voltage requirement samples and said unique amperage requirement samples; and v. communicate said control signals to the constant voltage/constant current controller; vi. wherein said microprocessor comprises: 1. a flash-based architecture; 2. a Controller Area Network bus connection operable to communicate programming instructions to said microprocessor, wherein said instructions include at least one pulse command sequence; 3. a serial communications link between said microprocessor and said RF transceiver operable to remotely communicate reprogramming instructions to said microprocessor, wherein said reprogramming instructions include at said least one pulse command sequence; and 4. storage capacity for said at least said one pulse command sequence.

17. The brake light pulser of claim 16, comprising:
a. said constant voltage/constant current controller operable to:
  i. receive brake light power from an automotive power source;
  ii. receive communication of said control signals from said microprocessor;
  iii. configure said brake light power responsive to said control signals; and
  iv. provide said configured brake light power to said MOSFET;
b. comprising said MOSFET operable to:
  i. receive said configured brake light power from said constant voltage/constant current controller;
  ii. receive said at least one pulse command sequence from said microprocessor;
  iii. pulse said configured brake light power responsive to said at least one pulse command sequence; and
  iv. supply said pulsed configured brake light power to said brake light.

18. The brake light pulser of claim 17, comprising said RF transceiver operable to: a. communicate reprogramming instructions to said microprocessor, wherein said reprogramming instructions determine said at least one pulse command sequence; and b. communicate data from said microprocessor to a user.

19. The brake light pulser of claim 17, wherein said microprocessor is reprogrammable via said RF transceiver.

* * * * *